United States Patent
Bai et al.

(10) Patent No.: US 12,212,442 B2
(45) Date of Patent: Jan. 28, 2025

(54) GNB-CONTROLLED RADIO FREQUENCY (RF) SENSING

(71) Applicant: QUALCOMM Incorporated, San Diego, CA (US)

(72) Inventors: Tianyang Bai, Somerville, NJ (US); Yuwei Ren, Beijing (CN); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/996,242

(22) PCT Filed: Jun. 4, 2020

(86) PCT No.: PCT/CN2020/094280
§ 371 (c)(1),
(2) Date: Oct. 14, 2022

(87) PCT Pub. No.: WO2021/243627
PCT Pub. Date: Dec. 9, 2021

(65) Prior Publication Data
US 2023/0188389 A1    Jun. 15, 2023

(51) Int. Cl.
*H04L 23/02* (2006.01)
*H04L 5/00* (2006.01)
*H04L 27/00* (2006.01)

(52) U.S. Cl.
CPC ........ *H04L 27/0006* (2013.01); *H04L 5/0026* (2013.01); *H04L 5/0028* (2013.01); *H04L 5/0092* (2013.01)

(58) Field of Classification Search
CPC ... H04L 27/2602; H04L 5/001; H04L 5/0028; H04W 24/08; H04W 24/10; H04W 8/24
(Continued)

(56) References Cited

U.S. PATENT DOCUMENTS

2010/0246506 A1    9/2010  Krishnaswamy
2015/0355110 A1   12/2015  Sappok et al.
(Continued)

FOREIGN PATENT DOCUMENTS

CN    106023349 A    10/2016
CN    110879639 A     3/2020

OTHER PUBLICATIONS

International Search Report and Written Opinion—PCT/CN2020/094280—ISA/EPO—Feb. 25, 2021.
(Continued)

*Primary Examiner* — Khai Tran
(74) *Attorney, Agent, or Firm* — Patterson & Sheridan LLP

(57) ABSTRACT

Certain aspects of the present disclosure provide techniques for radio frequency (RF) sensing. A method that may be performed by a UE generally includes receiving, from a base station (BS), a configuration for the UE to perform RF sensing. The method generally includes transmitting an RF sensing signal based on the configuration. The method generally includes performing one or more measurements of one or more reflections of the RF sensing signal. Certain aspects of the subject matter described in this disclosure can be implemented in a method for wireless communication by a BS. The method generally includes receiving a RF sensing capabilities message from a UE. The method generally includes transmitting, to the UE, a configuration for the UE to perform RF sensing based on the RF sensing capabilities message.

28 Claims, 8 Drawing Sheets

(58) Field of Classification Search
USPC .................................... 375/262, 260, 267
See application file for complete search history.

(56) References Cited

U.S. PATENT DOCUMENTS

| | | | |
|---|---|---|---|
| 2018/0275246 A1* | 9/2018 | Ma | ................. G01S 13/765 |
| 2019/0222983 A1 | 7/2019 | Adachi | |
| 2019/0369233 A1 | 12/2019 | Niesen et al. | |
| 2021/0286045 A1* | 9/2021 | Bayesteh | ................. H04L 5/14 |

OTHER PUBLICATIONS

Abrar A.S., et al., "Save Our Spectrum: Contact-Free Human Sensing Using Single Carrier Radio", arXiv:1811.10129v1 [eess.SP], Cornell University Library, 201 Olin Library Cornell University Ithaca, NY 14853, Nov. 26, 2018, pp. 1-13, XP081041074, p. 1.
Supplementary European Search Report—EP20939338—Search Authority—Munich—Feb. 7, 2024.

* cited by examiner

GNB-CONTROLLED RADIO FREQUENCY (RF) SENSING

CROSS-REFERENCE TO RELATED APPLICATION(S)

This application is a national stage application under 35 U.S.C. 371 of PCT/CN2020/094280, filed Jun. 4, 2020, which is hereby expressly incorporated by reference herein in its entirety as if fully set forth below and for all applicable purposes.

BACKGROUND

Field of the Disclosure

Aspects of the present disclosure relate to wireless communications, and more particularly, to techniques for radio frequency (RF) sensing.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved radio frequency (RF) sensing.

Certain aspects of the subject matter described in this disclosure can be implemented in a method for wireless communication by a user equipment (UE). The method generally includes receiving, from a base station (BS), a configuration for the UE to perform RF sensing. The method generally includes transmitting an RF sensing signal based on the configuration. The method generally includes performing one or more measurements of one or more reflections of the RF sensing signal.

Certain aspects of the subject matter described in this disclosure can be implemented in a method for wireless communication by a BS. The method generally includes receiving a RF sensing capabilities message from a UE. The method generally includes transmitting, to the UE, a configuration for the UE to perform RF sensing based on the RF sensing capabilities message.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
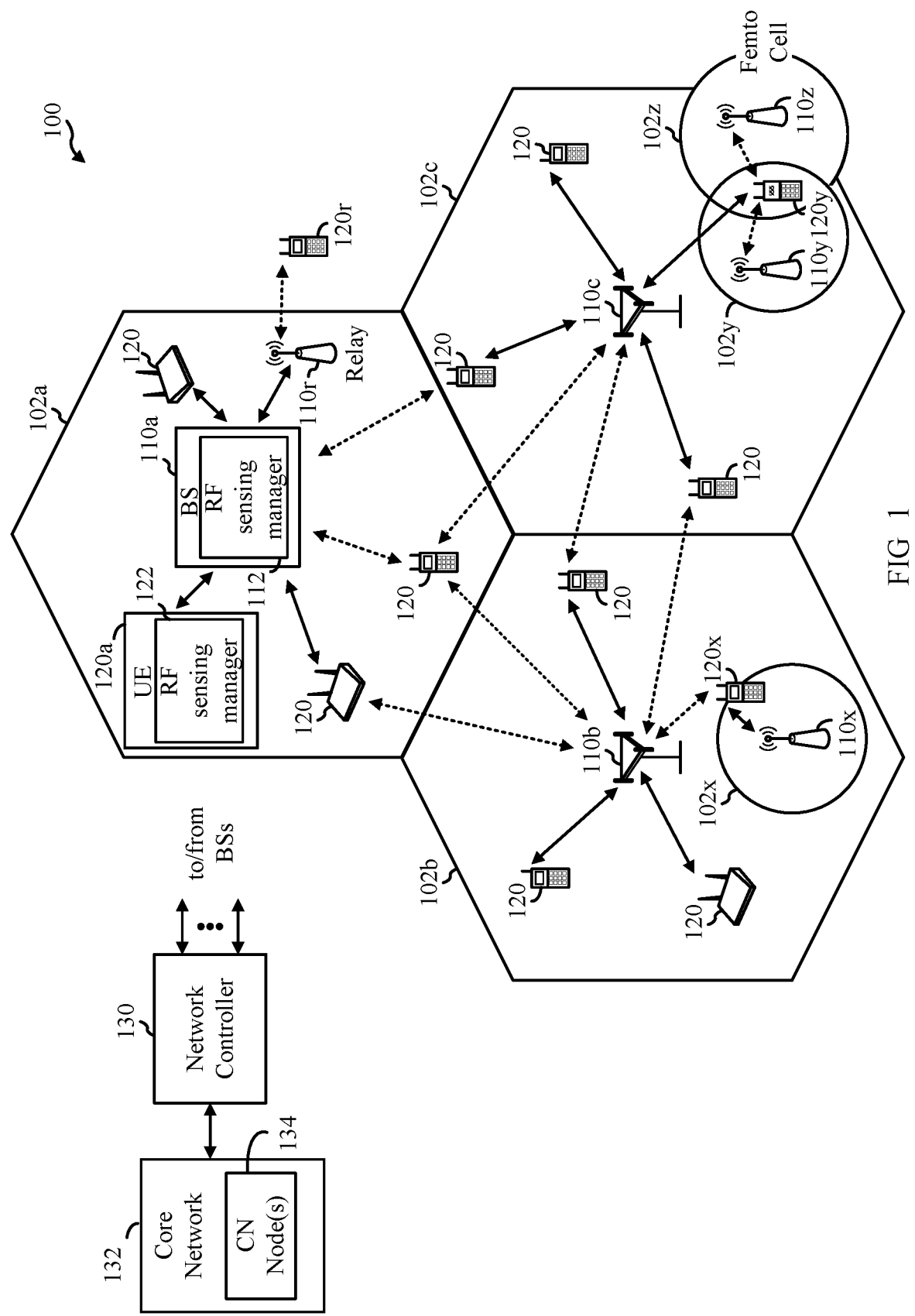
FIG. 1 is a block diagram conceptually illustrating an example telecommunications system, in accordance with certain aspects of the present disclosure.

Aspects of the present disclosure provide apparatus, methods, processing systems, and computer readable mediums for radio frequency (RF) sensing. RF sensing can be controlled by the network, such as by a base station (BS). The RF sensing may be configured for and performed by a user equipment (UE) and/or the BS. The BS may configure the RF sensing to manage potential interference and conflicts. For example, the RF sensing may be configured in a same frequency band as a communication frequency band. In this case, RF sensing may interfere and/or conflict with RF sensing and/or uplink, downlink, sidelink, and/or other communications by the UE, the BS, and/or other UEs or devices in the communication band.

In some examples, the UE transmits a UE capability message to the BS including parameters that the UE supports for RF sensing. The configuration sent by the BS schedules time and frequency resources, and parameters, for the UE to perform RF sensing. The configuration may be in response to a request sent by the UE and may take into account the UE capabilities. The configuration may include one or more beams for the UE to use for the RF sensing. The BS and/or UE may also determine a power level for transmitting the RF sensing signal.

The following description provides examples of RF sensing in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more BSs 110 and/or UE 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for RF sensing. As shown in FIG. 1, the BS 110a includes a RF sensing manager 112. The RF sensing manager 112 may be configured to receive a RF sensing capabilities message from a UE and to transmit, to the UE, a configuration for the UE to perform RF sensing based on the RF sensing capabilities message, in accordance with aspects of the present disclosure. As shown in FIG. 1, the UE 120a includes a RF sensing manager 122. The RF sensing manager 122 may be configured to receive, from a BS, a configuration for the UE to perform RF sensing; to transmit an RF sensing signal based on the configuration; and to perform one or more measurements of one or more reflections of the RF sensing signal, in accordance with aspects of the present disclosure.

Figure 2:
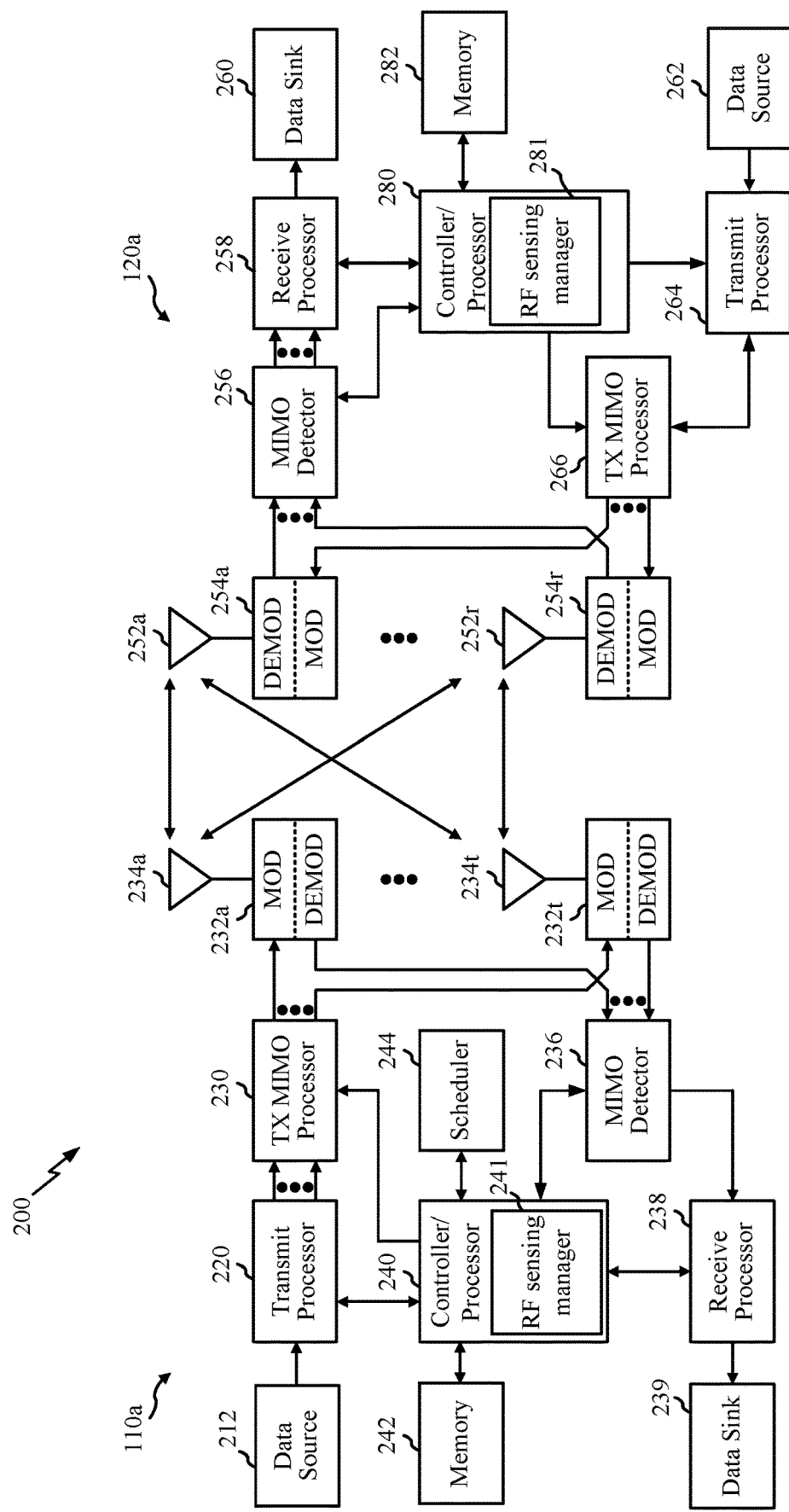
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a RF sensing manager 241 that may be configured for signaling RF sensing configurations, according to aspects described herein. As shown in FIG. 2, the controller/processor 280 of the UE 120a has a RF sensing manager 281 that may be configured for RF sensing, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
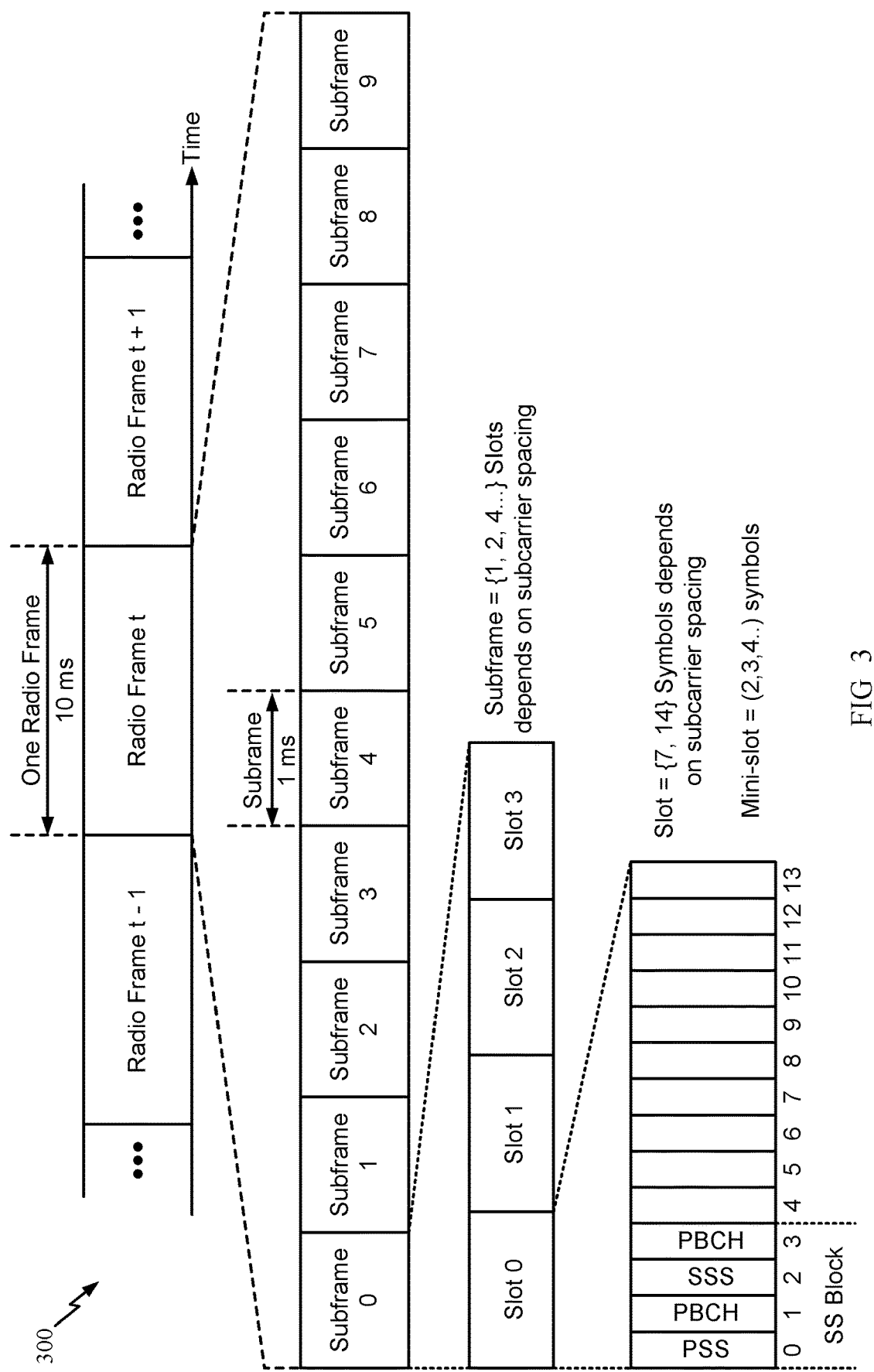
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

As discussed above, aspects of the disclosure relate to RF sensing. RF sensors generally operate by defining a sensitive volume and monitoring various parameters of materials that may enter the volume. The parameters may be simultaneously measured by either a single sensors or a sensor pair where the sensor deduces the nature and behavior of any item(s) that invade the volume. The nature and behavior of the item(s) that invade the volume may generate a signature. The size of an antenna of the RF sensor(s) may determine the sensitive volume, and the construction materials of the antenna may correspond to an operating temperature of the antenna. The RF sensor may operate by exciting the antenna at a specified operating frequency, and measuring changes in the real and imaginary components of the parameters.

Example RF Sensing

Aspects of the present disclosure provide for radio frequency (RF) sensing. RF sensing generally refers to the use of radio signals to ascertain characteristics about an environment (e.g., similar to a radar system). For example, an RF signal may be transmitted in one or more directions into an environment, and the environment may reflect the RF signals. The reflected signals can be measured to determine a distance and/or angle of an object (e.g., an objected that reflected the RF signal being measured) relative to the device performing the RF sensing.

In aspects, RF sensing may be performed in a wireless communication network, such as new radio (e.g., 5G NR). The RF sensing may be performed by a user equipment (UE) and/or a base station (e.g., a next generation Node B (gNB) in a NR network). According to certain aspects, RF sensing may be configured, and controlled, by a BS. The BS may control the RF sensing to mitigate interference and conflicts.

According to certain aspects, RF sensing may be done to detect objects/physical obstructions in the system. For example, the RF sensing may detect "blockers" in a radio link between devices, such as between a UE and a BS. This information may be used to assist in beam management.

According to certain aspects, RF sensing may be used for detection of human body parts in close proximity to an antenna of a UE to assist with compliance to maximum permissible exposure (MPE) requirements. For example, the basic restriction for human exposure may be defined by Specific Absorption Rate (SAR) limits (e.g., according to FCC guidelines) and MPE limits may be derived from the SAR limits (e.g., in terms of free-space field strength and power density). For devices that operate at larger distances from persons, where there is minimal RF coupling interaction between a device and the user or nearby persons, a more complex SAR evaluation can be forgone by evaluating RF exposure compliance using MPE limits.

According to certain aspects, RF sensing may be used to detect an RF signature of the environment. This information may be used to assist in positioning. The information may be used for location specific machine learning algorithms for communications, such as for machine learning-based beam prediction based on the UE location.

Generally, RF sensing can be accomplished in any frequency band. In some cases, improved performance can be achieved by performing RF sensing using the same frequency band as a frequency based used for communications in the system. For example, instead of using a dedicated RF chip, RF sensing may share the antenna array and RF circuit used for wireless communication. RF sensing (e.g., such as the RF signature), may be frequency-specific. Thus, to learn about the communication environment, it may be desirable to use the same frequency band for RF sensing as the communications frequency band. For MPE detection, it may be advantageous to have a co-located antenna array or share the same array for communication and RF sensing.

According to certain aspects, the BS can manage potential interference and conflicts that may be caused by co-channel RF sensing and communication due to the similar bandwidth of the RF signals and communication signals.

Figure 4:
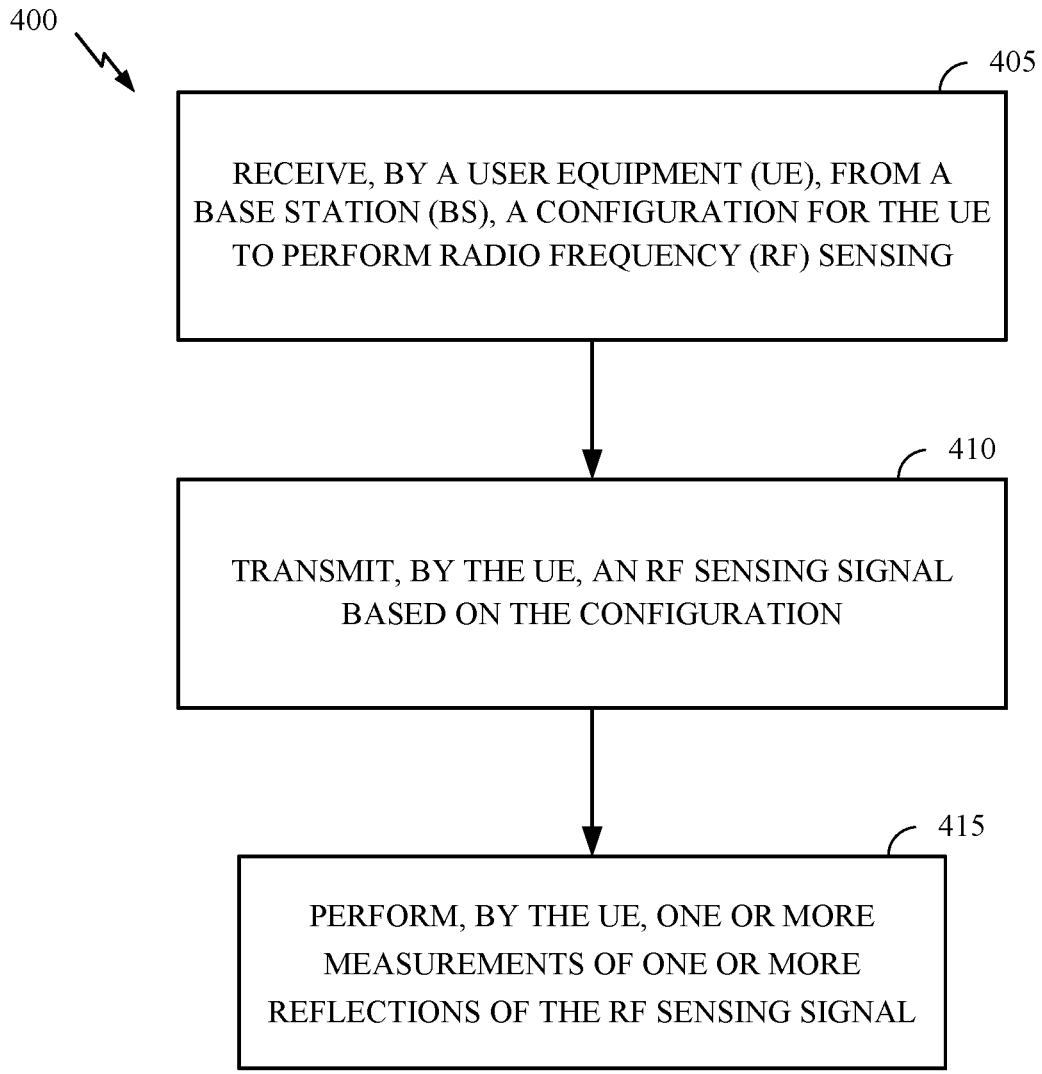
FIG. 4 is a flow diagram illustrating example operations for wireless communication by a UE, in accordance with certain aspects of the present disclosure.

FIG. 4 is a flow diagram illustrating example operations 400 for wireless communication, in accordance with certain aspects of the present disclosure. The operations 400 may be performed, for example, by UE (e.g., such as a UE 120a in the wireless communication network 100). Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at 405, by receiving, from a BS, a configuration for the UE to perform RF sensing.

At block 410, the UE transmits an RF sensing signal based on the configuration.

At block 415, the UE performs one or more measurements of one or more reflections of the RF sensing signal.

Figure 5:
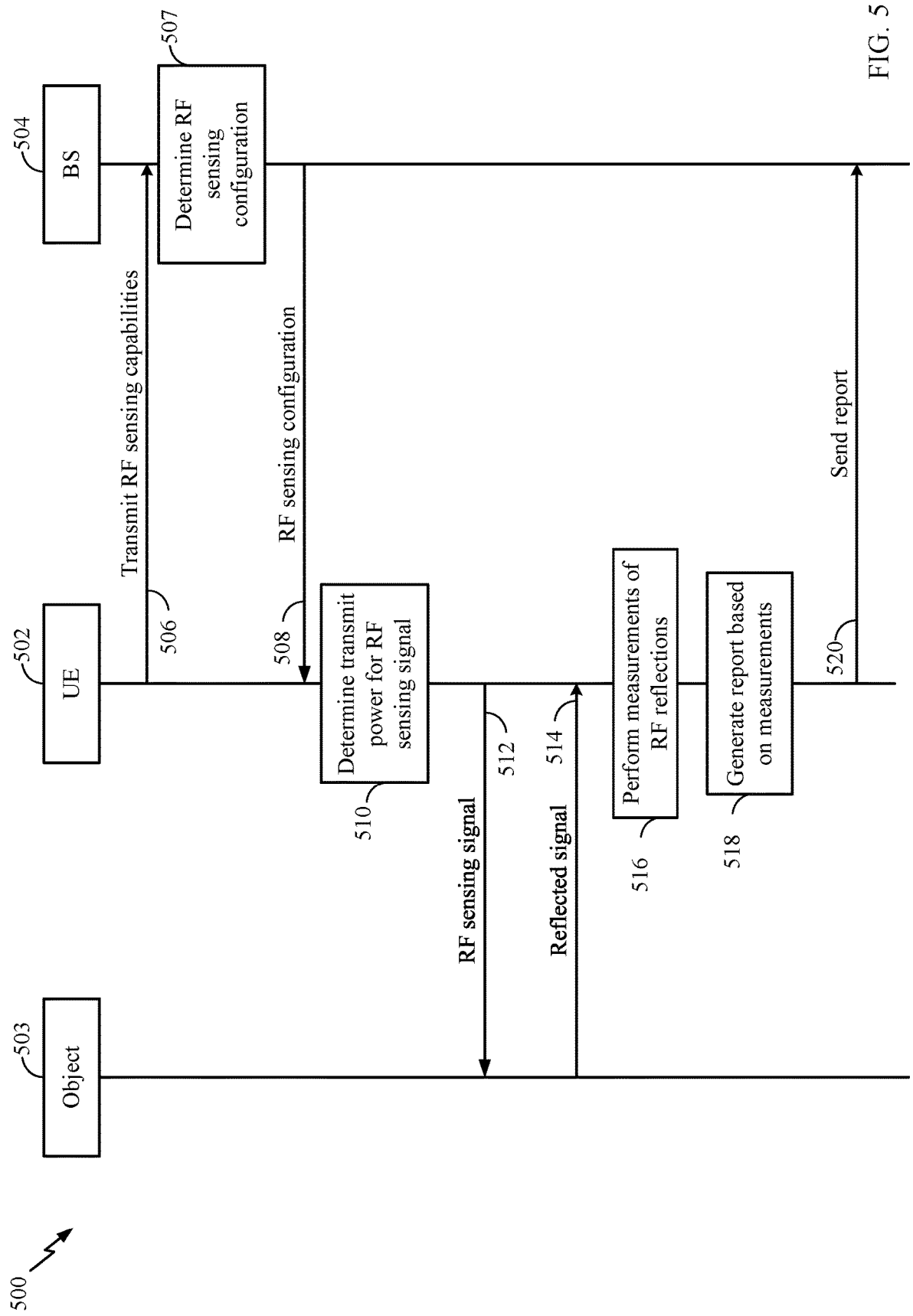
FIG. 5 is a call flow diagram illustrating example signaling for RF sensing configurations, in accordance with aspects of the present disclosure.

FIG. 5 is a call flow diagram 500 illustrating example RF sensing, in accordance with aspects of the present disclosure. As shown, a UE 502 (e.g., corresponding to the UE 120a of FIG. 1) may be served by the BS 504 (e.g., such as the BS 110a of FIG. 1 which may be a gNB).

At 506, the UE 502 may transmit an RF sensing capability message to the BS 504. For example, the RF sensing capability message sent by the UE 502 may indicate maximum bandwidth, a time duration, a waveform, and/or a number of beams that the UE 502 supports for RF sensing.

The BS 504, at block 507, may determine an RF sensing configuration for the UE 502 to perform RF sensing. The BS 504 may determine the RF sensing configuration based on the capability message from the UE 402. At 508, the BS 504 may transmit the RF sensing configuration to the UE 502. In some examples, the BS 504 may schedule resources, via the RF sensing configuration, such as dedicated time resources, dedicated frequency resources, and/or a dedicated scrambling sequence for the UE 502 to perform RF sensing. The resources may be periodic or aperiodic. The resources may be orthogonal to resources used by other UEs (not shown) for RF sensing, for communicating with the BS, or both. In some examples, the UEs may share a common gap time for RF sensing while using different scrambling sequences. The BS 504 may send the RF sensing configuration to the UE 502 in response to a request (not shown) from the UE 502.

The request may indicate a requested bandwidth for RF sensing and/or a time duration for RF sensing. The BS 504 may also provide information for the UE 502 to sense one or more particular directions (e.g., provided in the RF sensing configuration). For example, the BS 504 may specify sensing in a direction corresponding to a transmission configuration indicator (TCI) state beam for communication.

At 510, the UE 502 may determine a transmit power level to use for an RF sensing signal. In some aspects, the UE 502 may determine the transmit power level based on a specified regulation. In some aspects, the UE 502 may determine the transmit power based on a configuration (e.g., the RF sensing configuration) from the BS 504. In some aspects, the UE 502 may determine the transmit power based on a path loss measurement of at least one sidelink reference signal (RS) from another UE. Although only one UE 502 is depicted, one or more UEs (not shown) may be in the wireless communication system with the UE 502

At 512, the UE 502 may transmit an RF sensing signal into the environment. In certain aspects, the RF sensing signal may be in a same frequency band as a communication frequency band. As explained above, the RF sensing signal may be sent in a particular direction in accordance with the configuration sent by the gNB 504. The RF sensing signal may then be reflected by an object 503 in the environment and received, at 514, by the UE 514. The UE 502 may, at 516, perform measurements on the received RF signal reflection(s). Based on the measurements, the UE 502 may, at 518, generate a report based on the measurements. At 520, the UE 502 may send the report to the gNB 504. The report generated by the UE 502 may indicate detection of a location of a human body near an antenna of the UE for MPE detection, detection of one or more objects (e.g., the object 503) in the environment potentially blocking a signal path, an RF signature of the environment, and/or may include the measurement results. In the case of detecting for MPE, the reporting of the measurements by the UE may indicate the power levels of certain uplink beams may be decreased.

Figure 6:
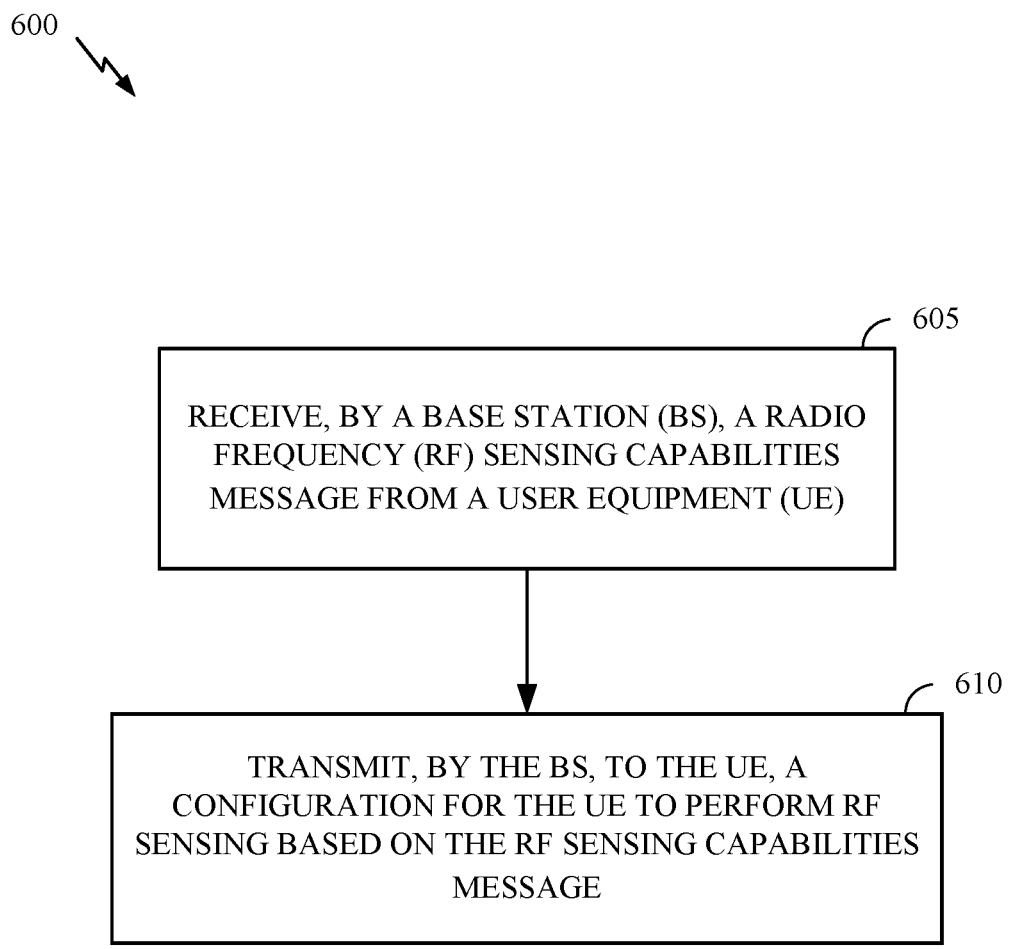
FIG. 6 is a flow diagram illustrating example operations for wireless communication by a BS, in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., such as the BS 110*a* in the wireless communication network 100). The operations 600 may be complimentary operations by the operations 400 performed by the UE. Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at 605, by receiving a RF sensing capability message from a UE.

At 610, the BS transmits, to the UE, a configuration for the UE to perform RF sensing based on the RF sensing capability message.

Figure 7:
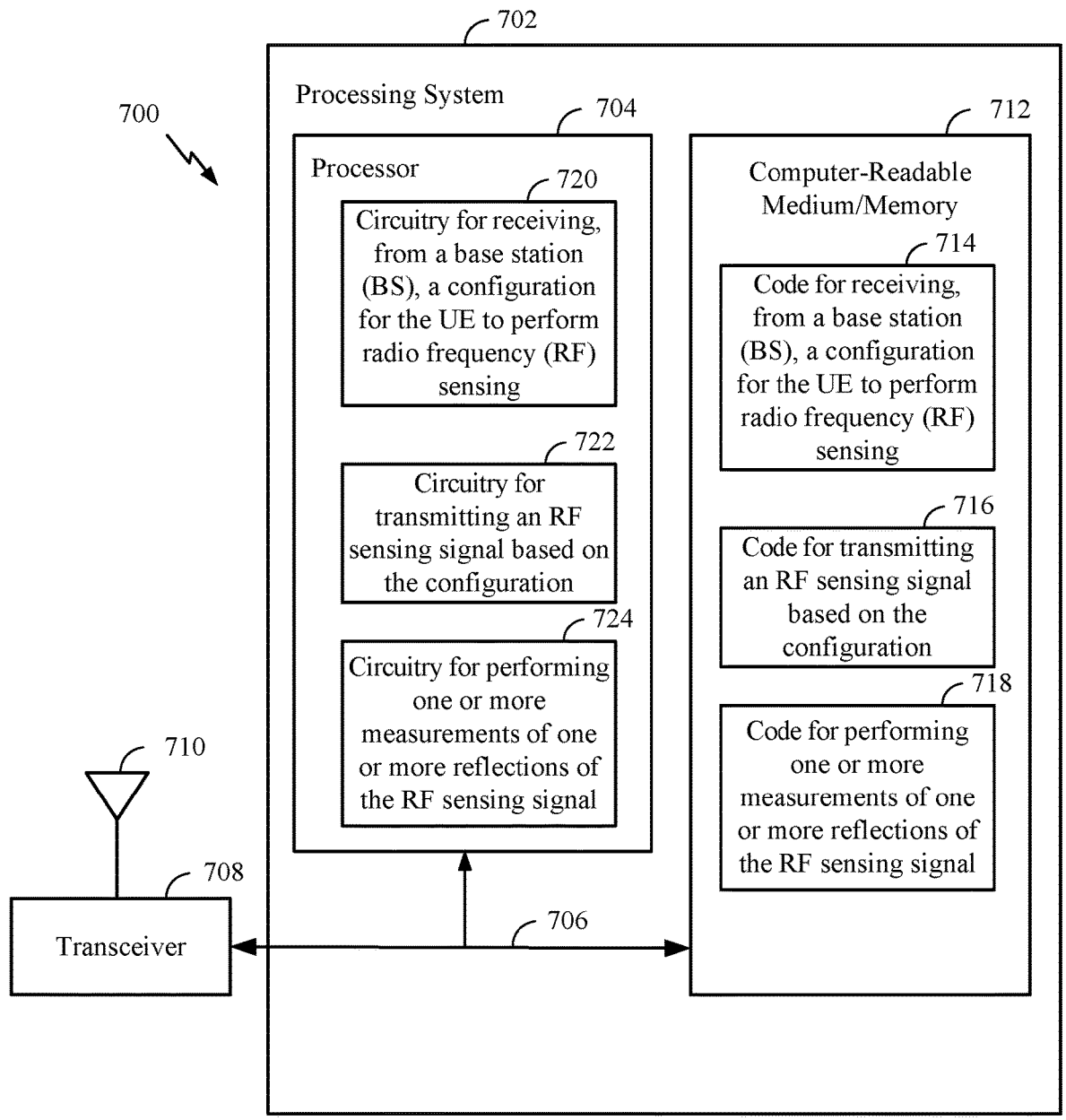
FIG. 7 illustrates a communications device that may include various components configured to perform operations for the techniques disclosed herein in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for signaling RF sensing configurations. In certain aspects, computer-readable medium/memory 712 stores code 714 for receiving, from a BS, a configuration for the UE to perform RF sensing; code 716 for transmitting an RF sensing signal based on the configuration; and code 718 for performing one or more measurements of one or more reflections of the RF sensing signal. In certain aspects, the processor 704 has circuitry configured to implement the code stored in the computer-readable medium/memory 712. The processor 704 includes circuitry 720 for receiving, from a BS, a configuration for the UE to perform RF sensing; circuitry 722 for transmitting an RF sensing signal based on the configuration; and circuitry 724 for performing one or more measurements of one or more reflections of the RF sensing signal.

Figure 8:
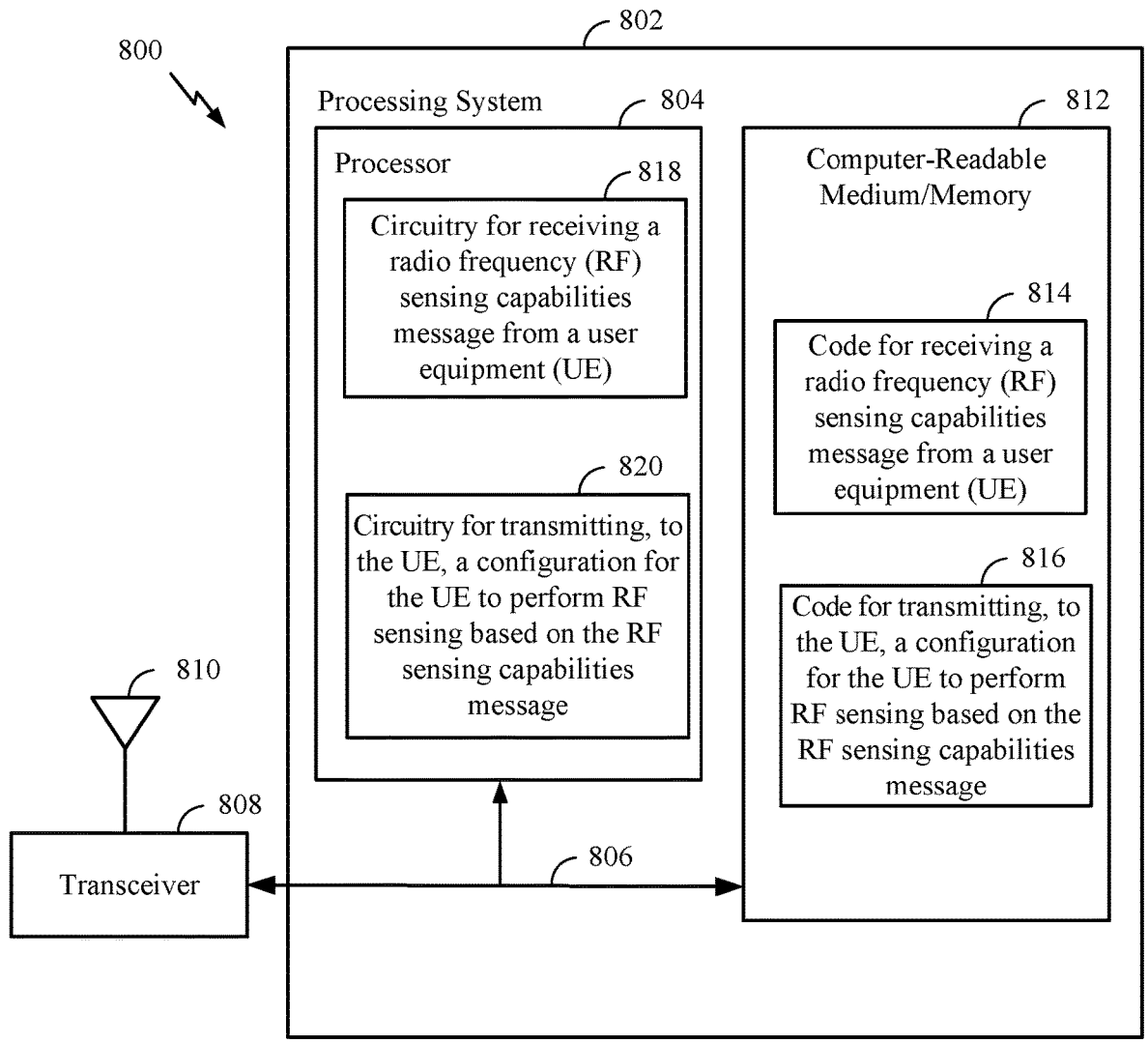
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for signaling RF sensing configurations. In certain aspects, computer-readable medium/memory 812 stores code 814 for receiving a RF sensing capabilities message from a UE; and code 816 for transmitting, to the UE, a configuration for the UE to perform RF sensing based on the RF sensing capabilities message. In certain aspects, the processor 804 has circuitry configured to implement the code stored in the computer-readable medium/memory 812. The processor 804 includes circuitry 818 for receiving a RF sensing capabilities message from a UE; and circuitry 820 for transmitting, to the UE, a configuration for the UE to perform RF sensing based on the RF sensing capabilities message.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, gNB, gNodeB, access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/ or encoded) thereon, the instructions being executable by one or more processors to perform the operations described herein, for example, instructions for performing the operations described herein and illustrated in FIG. 4 and/or FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), comprising:
receiving, from a base station (BS), a configuration for the UE to perform radio frequency (RF) sensing, wherein the configuration comprises scheduling resources including dedicated time resources, dedicated frequency resources, a dedicated scrambling sequence, or a combination thereof, for the UE to perform RF sensing;
transmitting an RF sensing signal based on the configuration; and
performing one or more measurements of one or more reflections of the RF sensing signal.

2. The method of claim 1, wherein the configuration configures the UE for transmitting the RF sensing signal in a same frequency band as a communication frequency band.

3. The method of claim 1, further comprising transmitting a UE capability message to the BS comprising a maximum bandwidth, a time duration, a waveform, a number of beams, or a combination thereof, that the UE supports for RF sensing.

4. The method of claim 1, wherein the dedicated time resources, dedicated frequency resources, dedicated scrambling sequence, or combination thereof are orthogonal to time resources, frequency resources, scrambling sequence, or a combination thereof used by other UEs for RF sensing, communicating with the BS, or both.

5. The method of claim 1, wherein the scheduling is aperiodic or periodic.

6. The method of claim 1, further comprising sending a request to the BS for RF sensing resources, wherein the scheduling is in response to the request.

7. The method of claim 6, further comprising indicating a requested bandwidth for RF sensing, a time duration for RF sensing, or both, in the request.

8. The method of claim 1, wherein the configuration for the UE to perform RF sensing comprises time resources common with another UE and a dedicated scrambling sequence for RF sensing by the UE during the time resources, wherein the scrambling sequence is different than a scrambling sequence used by the other UE during the time resources.

9. The method of claim 1, wherein the configuration for the UE to perform RF sensing comprises one or more beams for the UE to use for the RF sensing.

10. The method of claim 1, further comprising determining a power level for transmitting the RF sensing signal.

11. The method of claim 10, wherein the determining the power level is based on a specified regulation, the configuration from the BS, a path loss measurement of at least one sidelink reference signal (RS) from another UE, or a combination thereof.

12. The method of claim 1, further comprising:
based on the one or more measurements of the one or more reflections of the RF sensing signal, detecting a location of a human body near an antenna of the UE for maximum permissible exposure (MPE) detection, detecting one or more objects in an environment potentially blocking a signal path, determining an RF signature of the environment; and
reporting results of the one or more measurements to the BS.

13. A method of wireless communication by a base station (BS), comprising:
receiving a radio frequency (RF) sensing capabilities message from a user equipment (UE); and
transmitting, to the UE, a configuration for the UE to perform RF sensing based on the RF sensing capabilities message, wherein the configuration comprises scheduling resources including dedicated time resources, dedicated frequency resources, a dedicated scrambling sequence, or a combination thereof, for the UE to perform RF sensing.

14. The method of claim 13, wherein the configuration configures the UE for transmitting an RF sensing signal in a same frequency band as a communication frequency band.

15. The method of claim 13, wherein the RF sensing capabilities message comprises a maximum bandwidth, a time duration, a waveform, a number of beams, or a combination thereof, that the UE supports for RF sensing.

16. The method of claim 13, wherein the dedicated time resources, dedicated frequency resources, dedicated scrambling sequence, or combination thereof are orthogonal to time resources, frequency resources, scrambling sequence, or a combination thereof uses by other UEs for RF sensing, communicating with the BS, or both.

17. The method of claim 13, wherein the scheduling is aperiodic or periodic.

18. The method of claim 13, further comprising receiving a request from the UE for RF sensing resources, wherein the scheduling is in response to the request.

19. The method of claim 18, further comprising receiving an indication of a requested bandwidth for RF sensing, a time duration for RF sensing, or both, in the request.

20. The method of claim 13, wherein the configuration for the UE to perform RF sensing comprises time resources common with another UE and a dedicated scrambling sequence for RF sensing by the UE during the time resources, wherein the scrambling sequence is different than a scrambling sequence used by the other UE during the time resources.

21. The method of claim 13, wherein the configuration for the UE to perform RF sensing comprises one or more beams for the UE to use for the RF sensing.

22. The method of claim 13, further comprising receiving a report of results of one or more measurements to the BS, the report comprising at least one of a location of a human body near an antenna of the UE for maximum permissible exposure (MPE) detection, one or more objects in an environment potentially blocking a signal path, or an RF signature of an environment.

23. An apparatus for wireless communication, comprising:
one or more processors; and
memory coupled to the one or more processors, the memory comprising code executable by the one or more processors to cause the apparatus to:
receive, from a base station (BS), a configuration for the apparatus to perform radio frequency (RF) sensing, wherein the configuration comprises scheduling resources including dedicated time resources, dedicated frequency resources, a dedicated scrambling sequence, or a combination thereof, for the apparatus to perform RF sensing;
transmit an RF sensing signal based on the configuration; and
perform one or more measurements of one or more reflections of the RF sensing signal.

24. An apparatus for wireless communication, comprising:
one or more processors; and
memory coupled to the one or more processors, the memory comprising code executable by the one or more processors to cause the apparatus to:
receive a radio frequency (RF) sensing capabilities message from a user equipment (UE); and
transmit, to the UE, a configuration for the UE to perform RF sensing based on the RF sensing capabilities message, wherein the configuration comprises scheduling resources including dedicated time resources, dedicated frequency resources, a dedicated scrambling sequence, or a combination thereof, for the UE to perform RF sensing.

25. An apparatus for wireless communication, comprising:
means for receiving, from a base station (BS), a configuration for the apparatus to perform radio frequency (RF) sensing, wherein the configuration for the apparatus to perform RF sensing comprises comprising scheduling resources including dedicated time resources, dedicated frequency resources, a dedicated scrambling sequence, or a combination thereof, for the apparatus to perform RF sensing;
means for transmitting an RF sensing signal based on the configuration; and
means for performing one or more measurements of one or more reflections of the RF sensing signal.

26. An apparatus for wireless communication, comprising:
means for receiving a radio frequency (RF) sensing capabilities message from a user equipment (UE); and
means for transmitting, to the UE, a configuration for the UE to perform RF sensing based on the RF sensing capabilities message, wherein the configuration for the UE to perform RF sensing comprises scheduling resources including dedicated time resources, dedicated frequency resources, a dedicated scrambling sequence, or a combination thereof, for the UE to perform RF sensing.

27. A non-transitory computer-readable medium having instructions stored thereon that when executed cause one or more processors to:
receive, from a base station (BS), a configuration for a user equipment (UE) to perform radio frequency (RF) sensing, wherein the configuration for the UE to perform RF sensing comprises comprising scheduling resources including dedicated time resources, dedicated frequency resources, a dedicated scrambling sequence, or a combination thereof, for the UE to perform RF sensing;
transmit an RF sensing signal based on the configuration; and
perform one or more measurements of one or more reflections of the RF sensing signal.

28. A non-transitory computer-readable medium having instructions stored thereon that when executed cause one or more processors to:
receive a radio frequency (RF) sensing capabilities message from a user equipment (UE); and
transmit, to the UE, a configuration for the UE to perform RF sensing based on the RF sensing capabilities message, wherein the configuration for the UE to perform RF sensing comprises scheduling resources including dedicated time resources, dedicated frequency resources, a dedicated scrambling sequence, or a combination thereof, for the UE to perform RF sensing.

* * * * *